United States Patent [19]
Ghilardelli et al.

[11] Patent Number: 6,130,572
[45] Date of Patent: Oct. 10, 2000

[54] NMOS NEGATIVE CHARGE PUMP

[75] Inventors: Andrea Ghilardelli, Cinisello Balsamo; Jacopo Mulatti, Latisana; Maurizio Branchetti, San Polo D'Enza, all of Italy

[73] Assignee: STMicroelectronics S.r.l., Agrate Brianza, Italy

[21] Appl. No.: 09/012,331

[22] Filed: Jan. 23, 1998

[30] Foreign Application Priority Data

Jan. 23, 1997 [EP] European Pat. Off. ............... 9780014

[51] Int. Cl.$^7$ ........................................ G05F 3/02
[52] U.S. Cl. ................................. 327/536; 327/534
[58] Field of Search .................................. 327/534, 536, 327/537, 589; 363/59, 60

[56] References Cited

U.S. PATENT DOCUMENTS

| | | | |
|---|---|---|---|
| 4,922,402 | 5/1990 | Olivo et al. | 363/60 |
| 5,489,870 | 2/1996 | Arakawa | 327/536 |
| 5,612,921 | 3/1997 | Chang et al. | 365/226 |

FOREIGN PATENT DOCUMENTS

| | | |
|---|---|---|
| 0 570 597 A1 | 11/1993 | European Pat. Off. . |
| 0 616 329 A2 | 9/1994 | European Pat. Off. . |
| 0 638 984 A1 | 2/1995 | European Pat. Off. . |
| 0 678 970 A2 | 10/1995 | European Pat. Off. . |

*Primary Examiner*—Jung Ho Kim
*Attorney, Agent, or Firm*—Theodore E. Galanthay; David V. Carlson; Seed IP Law Group PLLC

[57] ABSTRACT

A negative charge pump circuit comprises a plurality of charge pump stages connected in series to each other. Each stage has a stage input terminal and a stage output terminal. A first stage has the stage input terminal connected to a reference voltage, a final stage has the stage output terminal operatively connected to an output terminal of the charge pump at which a negative voltage is developed; intermediate stages have the respective stage input terminal connected to the stage output terminal of a preceding stage and the respective stage output terminal connected to the stage input terminal of a following stage. Each stage comprises a first N-channel MOSFET with a first electrode connected to the stage input terminal and a second electrode connected to the stage output terminal, a second N-channel MOSFET with a first electrode connected to the stage output terminal and a second electrode connected to a gate electrode of the first N-channel MOSFET, a boost capacitor with one terminal connected to the gate electrode of the first N-channel MOSFET and a second terminal driven by a respective first digital signal switching between the reference voltage and a positive voltage supply, and a second capacitor with one terminal connected to the charge pump stage output terminal and a second terminal connected to a respective second digital signal switching between the reference voltage and the voltage supply. A gate electrode of the second N-channel MOSFET is connected, in the first stage, to a third digital signal switching between the reference voltage and the voltage supply, while in the remaining stage the gate electrode of the second N-channel MOSFET is connected to the stage input terminal.

31 Claims, 3 Drawing Sheets

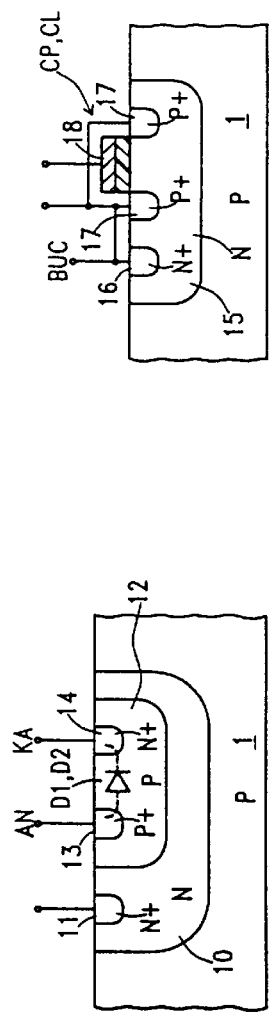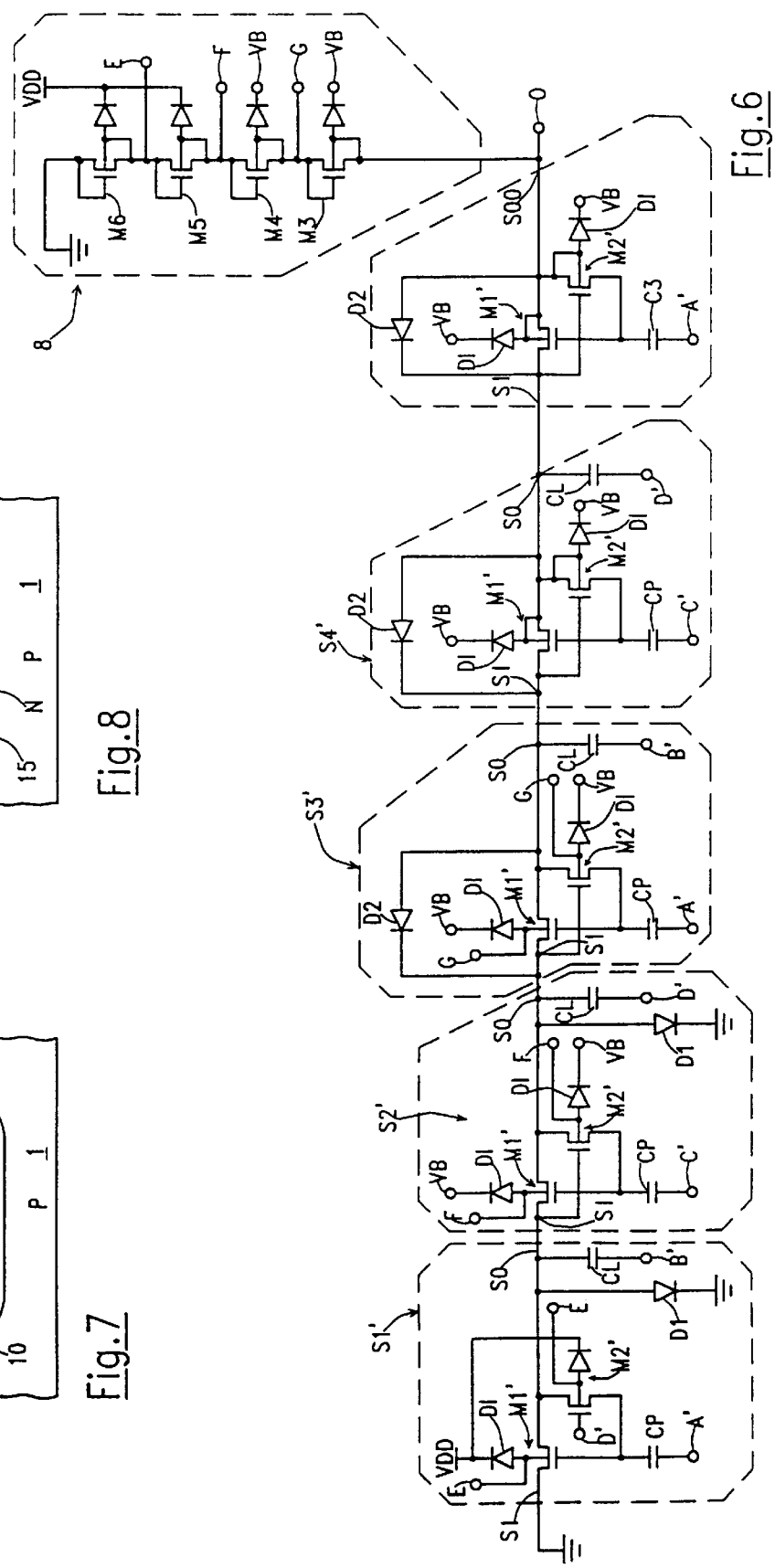

NMOS NEGATIVE CHARGE PUMP

TECHNICAL FIELD

The present invention relates to an NMOS negative charge pump, particularly for the integration in CMOS non-volatile memory devices.

BACKGROUND OF THE INVENTION

In the field of integrated circuits, particularly in non-volatile memory devices, it is often necessary to generate on-chip negative voltages starting from the positive voltage supply (VDD) which supplies the integrated circuit. This is for example the case of EEPROMs and Flash EEPROMs, wherein a negative voltage is necessary for the erase operation of the memory cells.

Conventionally, negative voltages are generated on-chip by means of negative charge pumps using P-channel MOSFETs, of the type shown in FIG. 1. With reference to this figure, it is possible to see that the negative charge pump is composed of several stages S1–S4 (four in this example), connected in series between ground and an output terminal O of the charge pump at which a negative voltage is provided. Each stage S1–S4 comprises a P-channel pass transistor M1, a P-channel pre-charge transistor M2, a charge storage capacitor CL driven by a respective first digital signal B or D periodically switching between ground and the voltage supply VDD, and a boost capacitor CP driven by a respective second digital signal A or C substantially in phase opposition with respect to signal B or D; the simplified timing of signals A, B, C and D is depicted in FIG. 2.

In operation, a positive charge flow takes place from the storage capacitor CL of a given stage to the storage capacitor CL of the adjacent, left-hand stage in FIG. 1, through the pass transistors M1, so that the output terminal O acquires a negative potential. The pre-charge transistor M2 pre-charges the boost capacitor CP, which in turn boosts the gate voltage of M1 so as to allow a most efficient charge transfer to take place.

When the negative charge pump is integrated in a CMOS integrated circuit, the P-channel MOSFETs are conventionally formed inside respective N-type wells which are in turn formed inside a common P-type semiconductor substrate.

The main drawbacks of the circuit described above will be now discussed.

First, due to the body effect affecting MOS transistors, a progressive increase in the threshold voltage of the P-channel MOSFETs takes place moving from the stages near to the terminal of the charge pump connected to ground to the stages proximate to the output terminal O. In fact, the N-type wells wherein the P-channel MOSFETs are formed cannot be biased at negative voltages (otherwise the N-type well/P-type substrate junction becomes forward biased), while the source and drain electrodes of the P-channel MOSFETs are biased at more and more negative potentials. This reduces efficiency of the charge pump, because the voltage gain of each stage decreases; this reflects on a higher number of stages being necessary for generating a given negative voltage. Furthermore, the body effect limits the negative voltage value that can be generated, because when the body effect is so high that the threshold voltage of the P-channel MOSFETs reaches the value of the voltage supply VDD, even if more stages are added to the charge pump the negative output voltage cannot increase further (in absolute value).

Second, P-channel MOSFETs are intrinsically slower than N-channel MOSFETs, so that the maximum operating frequency of the charge pump is limited; this has a negative impact on the output current capability of the charge pump.

Third, the charge pump structure shown in FIG. 1 has a poor reliability; in fact, when the pass transistors M1 are off, the voltage applied to their gate oxide is equal to the difference between their gate voltage and the bias voltage of the N-type wells inside which the transistors are formed; the gate voltage can go strongly negative (especially in the final stages of the charge pump), but the bias voltage of the N-type wells cannot be lower than 0 V (to prevent forward biasing of the N-type wells/P-type substrate junctions).

Fourth, conventional CMOS manufacturing process could easily provide N-channel MOSFETs which are more resistant to junction breakdown than their P-channel counterparts; in this case, the reliability of the charge pump is lower relative to using N-channel MOSFETS.

SUMMARY OF THE INVENTION

In view of the state of the art described, it is an object of the present invention to provide a negative charge pump which is not affected by the above mentioned problems.

According to the present invention, such object is attained by means of negative charge pump circuit comprising a plurality of charge pump stages connected in series to each other, each stage having a stage input terminal and a stage output terminal, said plurality of stages comprising a first stage having the respective stage input terminal connected to a reference voltage, a final stage having the respective stage output terminal operatively connected to an output terminal of the charge pump at which a negative voltage is developed, and a plurality of intermediate stages each having the respective stage input terminal connected to the stage output terminal of a preceding stage and the respective stage output terminal connected to the stage input terminal of a following stage, characterized in that each charge pump stage comprises a first N-channel MOSFET with a first electrode connected to the stage input terminal and a second electrode connected to the stage output terminal, a second N-channel MOSFET with a first electrode connected to the stage output terminal and a second electrode connected to a gate electrode of the first N-channel MOSFET, a boost capacitor with one terminal connected to the gate electrode of the first N-channel MOSFET and a second terminal driven by a respective first digital signal switching between the reference voltage and a positive voltage supply, and a second capacitor with one terminal connected to the stage output terminal and a second terminal connected to a respective second digital signal switching between the reference voltage and the voltage supply and substantially in phase opposition to the first digital signal, a gate electrode of the second N-channel MOSFET being connected, in the first stage, to a third digital signal switching between the reference voltage and the voltage supply, a gate electrode of the second N-channel MOSFET in all the stages other than said first stage being connected to the stage input terminal.

BRIEF DESCRIPTION OF THE DRAWINGS

The features and advantages of the present invention will be made apparent by the following detailed description of two particular embodiments thereof, illustrated as non-limiting examples in the annexed drawings, wherein:

FIG. 6 is a circuit diagram of a negative charge pump according to a second embodiment of the present invention;

FIG. 7 shows in cross-sectional view the structure of a junction diode for use in the charge pump of FIG. 6; and FIG. 8 shows in cross-sectional view the structure of a capacitor for use in the charge pump of FIG. 6.

DETAILED DESCRIPTION OF THE INVENTION

Figure 1:
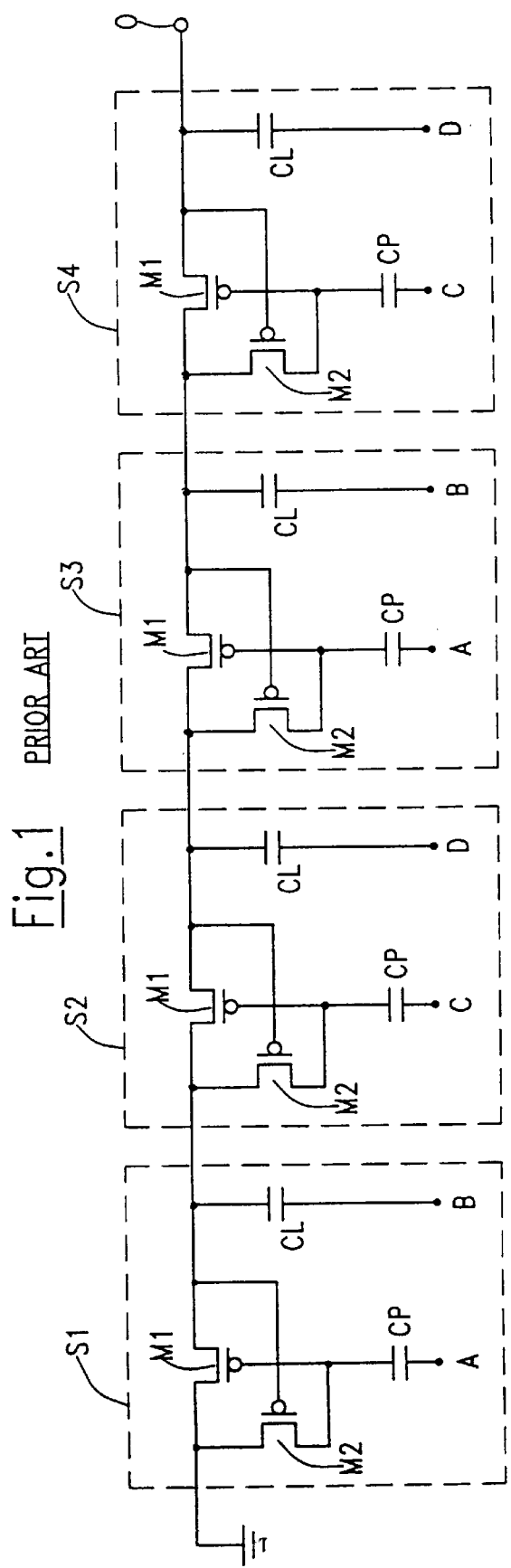
FIG. 1 is a circuit diagram of a negative charge pump according to the prior art.
Figure 2:
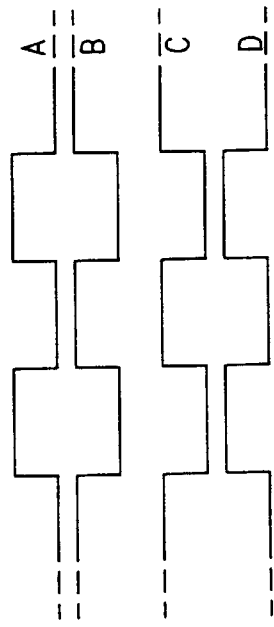
FIG. 2 is a simplified time diagram of drive signals for the charge pump of FIG. 1.

FIG. 1 shows the circuit structure of a negative charge pump according to the prior art, using P-channel MOSFETs; FIG. 2 shows the simplified time evolution of the drive signals of the charge pump of FIG. 1. This conventional kind of negative charge pump has already been discussed in the foregoing, and the drawbacks thereof have been described.

Figure 3:
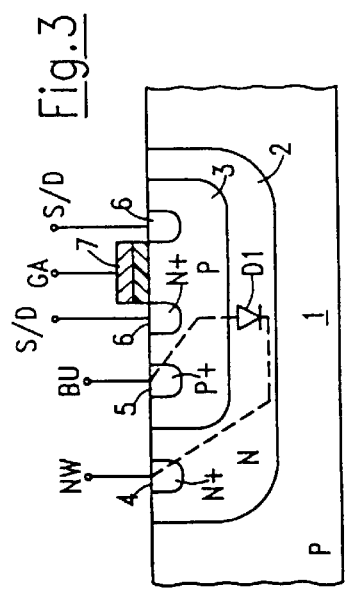
FIG. 3 shows in cross-sectional view the structure of an N-channel MOSFET for use in a negative charge pump according to the present invention.

FIG. 3 is a cross-sectional view of an N-channel MOSFET which is used in the negative charge pump according to the present invention. Inside a P type substrate 1 (which forms the common substrate of the integrated circuit wherein the negative charge pump is integrated), an N type well 2 is formed; inside the N type well 2, an N+ contact region 4 for biasing the N type well 2 and a P type well 3 are formed; inside the P type well 3, a P+ contact region 5 for biasing the P type well 3 and N+ source/drain regions 6 of the N-channel MOSFET are formed; over the P type well 3, between the source/drain regions 6, an insulated gate 7 is formed. The device has five terminals: two source/drain terminals S/D, a gate terminal GA, a bulk terminal BU and an N well bias terminal NW. The device is functionally equivalent to an N-channel MOSFET with a diode DI inserted between terminals BU and NW. This structure makes up one embodiment of a biasing subcircuit. Thanks to this structure, which can be realized using a triple-well CMOS manufacturing process, it is possible to bias the P type well 3 wherein the N-channel MOSFET is formed at a potential different from that of the P type substrate 1, which is normally kept grounded.

Figure 4:
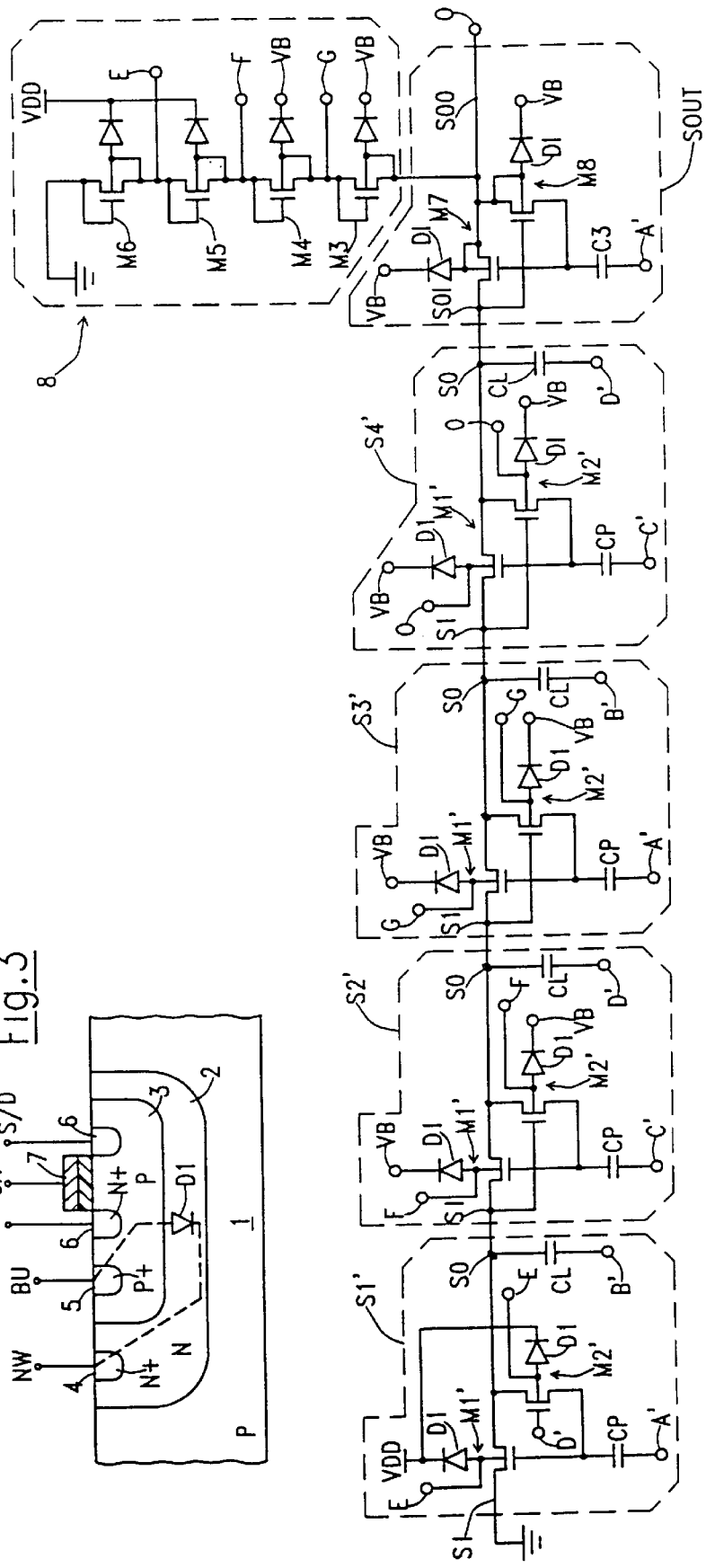
FIG. 4 is a circuit diagram of a first embodiment of a negative charge pump according to the present invention, which makes use of N-channel MOSFETs with the structure shown in FIG. 3.

In FIG. 4 a circuit diagram of a first embodiment of the present invention is shown. The negative charge pump comprises a plurality of stages (S1'–S4', totaling four in the shown example) connected in series between ground and a decoupling stage SOUT, the output thereof being an output terminal O of the charge pump at which a negative voltage is provided. Each stage has a stage input terminal SI (SOI) and a stage output terminal SO (SOO); the stage input terminal of the first stage S1' is connected to ground; the stage output terminal of the last stage S4' is connected to the input terminal SOI of the decoupling stage SOUT; the stage output terminal SOO of the latter is connected to the output terminal O; in the intermediate stages, the stage input terminal SI is connected to the stage output terminal of the preceding stage.

Figure 5:
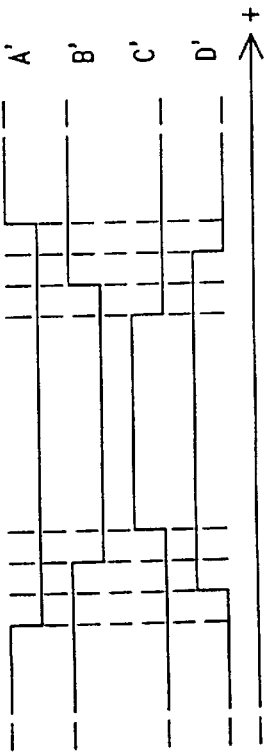
FIG. 5 is a time diagram of drive signals for the charge pump of FIG. 4.

Each stage S1'–S4' comprises an N-channel pass transistor M1' and an N-channel pre-charge transistor M2', both having the structure shown in FIG. 3, a storage capacitor CL and a boost capacitor CP. The pre-charge transistor M2' has source/drain terminals connected to the control gate of the pass transistor M1' and to a stage output terminal SO; in the first stage S1', the control gate of the pre-charge transistor M2' is driven by a digital signal D' (to be described hereinafter), while in all the other stages the control gate of M2' is connected to the stage input terminal SI. In each stage the boost capacitor CP has one plate driven by a respective digital signal A' or C', and the storage capacitor CL has one plate driven by another respective digital signal B' or D'. The timing of signals A', B', C' and D' is shown in FIG. 5; all these four signals are digital signals periodically switching between ground and a positive voltage supply VDD, which is the supply voltage of the integrated circuit wherein the charge pump is integrated.

The charge pump also comprises a bias voltage generator 8 which generates three bias voltages E, F and G; bias voltage E is used for biasing the bulk terminal BU of transistors M1' and M2' in the first stage S1'; bias voltage F is used for biasing the bulk terminal BU of transistors M1' and M2' in the second stage S2'; and bias voltage G is used for biasing the bulk terminal BU of transistors M1' and M2' in the third stage S3'. The bulk terminal BU of transistors M1' and M2' in the last stage S4' is instead connected directly to the output terminal O of the charge pump.

The decoupling stage SOUT is similar to the other stages S1'–S4', comprising N-channel MOSFETs M7 and M8 and a boost capacitor C3 driven by signal A'. The bulk terminal BU of MOSFETs M7 and M8 is connected to the output terminal O of the charge pump.

The bias voltage generator 8 comprises a voltage divider formed by four diode-connected N-channel MOSFETs M3–M6, having the structure shown in FIG. 3, connected in series between the output terminal O of the charge pump and ground. Bias voltages E, F and G are derived from intermediate nodes between MOSFETs M3 and M4, M4 and M5 and M5 and M6; thus, voltages E, F and G are progressively more negative. The bulk terminals BU of MOSFETs M3–M6 are short-circuited to the respective source terminals of the transistors.

The N-well terminals NW of MOSFETs M1' and M2' of the stages of the charge pump, as well as the N-well terminals of the MOSFETs M3–M6 of the bias voltage generator 8, could be directly connected to the positive voltage supply VDD. In this way, it would be assured that the junctions between the N type wells 2 and the P type substrate 1 are reverse biased and that the P type wells 3 wherein the MOSFETs are formed are electrically isolated from the substrate. However, it is preferable that the N-type well terminals NW of the MOSFETs whose P-type well is biased at negative voltages which are rather high in absolute value are biased at ground, to reduce electrical stresses. To this purpose, the N-type well terminals NW of MOSFETs M1' and M2' in stages S2' to S4', and M7 and M8 in SOUT, and the N-type well terminals NW of MOSFETs M4 and M3 in the bias voltage generator 8 are connected to a voltage VB which is switchable between the voltage supply VDD and ground. In operation, voltage VB will be kept at VDD as long as the output voltage O is low in absolute value, and is then switched to ground when the negative voltage O becomes high (in absolute value).

The operation of the circuit is the following.

When signal D' switches from "0" to "1" (i.e., from ground to VDD), the potential of the output terminal SO of stage S4' raises. Since signal B' is still at VDD, the potential of the output node SO of stage S3' is high, so that M2' in stage S4' is on; CP can thus charge (signal C' is still at ground). When signal B' switches from VDD to ground, M2' in stage S4' turns off; when signal C' switches to VDD, the gate voltage of M1' in stage S4' is boosted to a high value, and the potentials of the stage output terminal SO of stage S4' and of the stage output terminal SO of stage S3' are equalized by means of charge transfer from capacitor CL in stage S4' to capacitor CL in stage S3'. Then, M1' in stage S4' is turned off by switching of signal C' from VDD to ground. In this way, a positive charge has been transferred from capacitor CL in stage S4' to capacitor CL in stage S3'. In a similar way, a transfer of positive charge takes place from capacitor CL in one stage to capacitor CL in the left-hand adjacent stage, and finally to ground, so that the stage output terminal SO of the stage S4' acquires a negative potential. Stage SOUT decouples the output terminal O from the stage output terminal SO of stage S4'; the potential of node O will be approximately constant not affected by ripples present at the output SO of stage S4'.

It is to be observed that signals A', B', C' and D' are properly disoverlapped. In fact, signal C' cannot switch from ground to VDD before signal B' has switched from VDD to ground and signal D' has switched from ground to VDD; this is necessary to prevent a positive charge flow taking place from the left-hand to the right-hand stages of the charge pump; for similar reasons, signal C' must switch to ground before signal B' has switched to VDD and signal D' has switched to ground.

The arrangement shown in FIG. 4 minimizes the influence of body effect on the threshold voltages of the N-channel MOSFETs; thanks to the particular biasing scheme of the P-type wells 3 of the N-channel MOSFETs, it is assured that the P-type well of a given MOSFET is biased at the minimum among the source and drain voltages of the MOSFET; this is the best biasing condition, because the body effect is thus minimized. The number of elements of the voltage divider of the bias voltage generator 8 must be equal to the number of stages of the charge pump.

FIG. 6 is a circuit diagram of a second embodiment of the present invention. The differences from the structure shown in FIG. 4 are the following:

In each of the first two stages S1' and S2' of the charge pump, a respective junction diode D1 is provided having an anode connected to the output terminal SO of the respective stage and a cathode connected to ground. In the last two stages S3' and S4' and in the decoupling stage SOUT, a respective diode D2 is provided having an anode connected to the output terminals SO, SOO respectively of the stage, and a cathode connected to the input terminals SI, SOI respectively of the stage. This structure makes up one embodiment of a speed-up circuit.

The provision of diodes D1 and D2 has the advantage that the internal nodes of the charge pump start from an initial potential equal to the threshold voltage of a PN junction, instead of from a higher voltage. In this way, the charge pump can reach the steady-state quicker.

Preferably, diodes D1 and D2 have the structure shown in FIG. 7, comprising an N-type well 10 formed inside the P-type substrate 1, wherein an N+ contact region 11 and a P-type well 12 are formed. Inside the P-type well 12, a P+ region 13 and an N+ region 14 are formed. Region 11 provides a bias terminal for the N-type well 10; regions 13 and 14 respectively form the anode AN and cathode KA electrodes of the diode.

Junction diodes are preferred over P-channel MOSFETs because they are more reliable because junction diodes are not subject to oxide damages, and have a higher breakdown voltage. For these reasons, junction diodes can be directly connected between the internal nodes of the charge pump and ground (at least in the first stages of the pump), instead of between one stage and the following (as for example D2 in S4' and SOUT); thanks to this, the stages of the charge pump start from a voltage VT (threshold voltage of a PN junction) instead of higher voltages, and the charge pump reaches steady-state conditions faster.

FIG. 8 shows the structure of a PMOS-type capacitor used for the practical realization of capacitors CP and CL of the stages of the charge pump. In the P-type substrate 1, an N-type well 15 is formed; inside the N-type well 15, an N+ contact region 16 is formed for providing a bulk biasing terminal BUC, and two P+ regions 17 are also formed; over the surface of the N-type well 15 an insulated gate 18 is formed. The insulated gate forms one terminal of the capacitor, while the other terminal is formed by regions 17 and 16.

By connecting the terminals BUC and 17 of the capacitors to the respective digital signal A', B', C' or D' which drives one of the terminals of the capacitors, the capacitor can work also in the accumulation region. This kind of connection of the capacitors has two advantages: first, non diodes or start-up circuits are necessary for turning the capacitors on; second, and related to the first, the pump startup is faster, because it is not necessary to wait for turning of the capacitors on.

What is claimed is:

1. Negative charge pump circuit comprising:
   a plurality of charge pump stages connected in series to each other, each stage having a stage input terminal and a stage output terminal, said plurality of stages comprising a first stage having the respective stage input terminal connected to a reference voltage, a final stage having the respective stage output terminal operatively connected to an output terminal of the charge pump at which a negative voltage is developed, and a plurality of intermediate stages each having the respective stage input terminal connected to the stage output terminal of a preceding stage and the respective stage output terminal connected to the stage input terminal of a following stage, wherein each charge pump stage includes:
   a first N-channel MOSFET with a first electrode connected to the stage input terminal and a second electrode connected to the stage output terminal;
   a second N-channel MOSFET with a first electrode connected to the stage output terminal and a second electrode connected to a gate electrode of the first N-channel MOSFET;
   a boost capacitor with one terminal connected to the gate electrode of the first N-channel MOSFET and a second terminal driven by a respective first digital signal switching between the reference voltage and a positive voltage supply;
   a second capacitor with one terminal connected to the charge pump stage output terminal and a second terminal connected to a respective second digital signal switching between the reference voltage and the voltage supply and substantially in phase opposition to the first digital signal;
   a gate electrode of the second N-channel MOSFET being connected, in the first stage, to a third digital signal switching between the reference voltage and the voltage supply; and
   a gate electrode of the second N-channel MOSFET in all the stages other than said first stage being connected to the stage input terminal.

2. The negative charge pump according to claim 1 wherein said third digital signal coincides with the second digital signal of a second stage having the stage input terminal connected to the stage output terminal of said first stage.

3. The negative charge pump according to claim 2, further comprising:
   a decoupling stage having an input terminal connected to the stage output terminal of said final stage; and
   an output terminal connected to the output terminal of the charge pump.

4. The negative charge pump according to claim 3 wherein said decoupling stage comprises:
   a third N-channel MOSFET with a first and a second electrodes respectively connected to the input and output terminals of the decoupling stage;
   a fourth N-channel MOSFET with a first and a second electrodes respectively connected to a gate electrode of the third N-channel MOSFET and to the output terminal of the decoupling stage; and
   a third capacitor with one terminal connected to the gate electrode of the third N-channel MOSFET and a second terminal driven by a respective digital signal switching periodically between the reference voltage and the voltage supply.

5. The negative charge pump according to claim 4 wherein each of said first, second, third and fourth N-channel MOSFETs has a respective bulk electrode, the bulk electrodes of the first and second N-channel MOSFETs in each charge pump stage being biased by a respective bias voltage for that stage which becomes progressively more negative in going from the first stage towards the final stage, the bulk electrodes of the third and fourth N-channel MOSFETs in the decoupling stage being connected to the output terminal of the charge pump.

6. The negative charge pump according to claim 5, further comprising a bias voltage generator generating said bias voltages starting from the voltage of the output terminal of the charge pump.

7. The negative charge pump according to claim 6 wherein said bias voltage generator comprises a voltage divider connected between the output terminal of the charge pump and the reference voltage, the voltage divider having a number of intermediate nodes directly proportional to the number of stages of the charge pump.

8. The negative voltage pump according to claim 7 wherein said voltage divider comprises a series connection of diode-connected N-channel MOSFETs, said intermediate nodes being common nodes of adjacent diode-connected MOSFETs.

9. The negative charge pump according to claim 8 wherein each of said first, second, third and fourth N-channel MOSFETs comprises:
   an N-type well formed in a P-type substrate;
   a P-type well formed inside the N-type well; and
   an N-type source/drain regions formed inside the P-type well.

10. The negative charge pump according to claim 9 wherein the first stage and each stage of a first sub-plurality of stages proximate to the first stage comprise a respective junction diode having an anode connected to the stage output terminal and a cathode connected to the reference voltage.

11. The negative charge pump according to claim 10 wherein in each of said N-type wells an N-type well contact region is formed.

12. The negative charge pump according to claim 11 wherein the well contact regions of the first and second MOSFETs of the first stage are electrically connected to the voltage supply, while the well contact regions of the first and second MOSFETs of the remaining stages and of the third and fourth MOSFETs of the decoupling stage are connected to a switchable potential which is switchable between the voltage supply and the reference voltage.

13. The negative charge pump according to claim 12 wherein each stage of a second sub-plurality of stages proximate to the output terminal and the decoupling stage comprise a respective junction diode with an anode connected to the stage output terminal and a cathode connected to the stage input terminal.

14. The negative charge pump according to claim 13 wherein the first and second digital signals supplying a given stage are substantially in phase opposition respectively to the first and second digital signals supplying the adjacent stages.

15. The negative charge pump according to claim 14 wherein the first and second digital signals supplying each stage are disoverlapped, so that the second terminal of the second capacitor is driven to the reference voltage after the second terminal of the boost capacitor has been driven to the reference voltage, and the second terminal of the second capacitor is driven back to the supply voltage before the second terminal of the boost capacitor is driven back to the supply voltage.

16. The negative charge pump according to claim 15 wherein the first digital signals supplying two adjacent stages are disoverlapped, so that the second terminal of the boost capacitor in each stage is driven to the supply voltage after the second terminal of the boost capacitors in the adjacent stages has been driven to the reference voltage, and after the second terminal of the second capacitor in the adjacent stages has been driven to the reference voltage, and the second terminal of the boost capacitor in each stage is driven back to the reference voltage before the second terminal of the boost capacitors in the adjacent stages is driven back to the supply voltage and before the second terminal of the second capacitor in the adjacent stages is driven back to the supply voltage.

17. The negative charge pump according to claim 16 wherein in each stage the second digital signal switches from the supply voltage to the reference voltage after the second digital signal in the adjacent stages has switched from the reference voltage to the supply voltage and before the first digital signal in the adjacent stages switches from the reference voltage to the supply voltage, and said second digital signal in each stage switches from the reference voltage to the supply voltage after the first digital signal in the adjacent stages has switched from the supply voltage to the reference voltage and before the second digital signal in the adjacent stages switches from the supply voltage to the reference voltage.

18. The negative charge pump according to claim 17 wherein each one of said boost capacitor, second capacitor and third capacitor is formed by an N-type well formed in said P-type substrate and by at least one P-type region formed in said N-type well, a first terminal of the capacitor being formed by said P-type region short-circuited to said N-type well, and a second terminal of the capacitor being formed by a conductive gate insulatively disposed over said N-type well.

19. A negative charge pump, comprising:
   a plurality of stage circuits coupled to each other in stages, including at least a first stage and a second stage;

at least one NMOS transistor formed within an N-type well, coupled between a first voltage and an output terminal within each stage; and a biasing sub-circuit coupled to the NMOS transistor in each stage;

wherein an input of the second stage circuit is coupled to the output terminal of the previous stage, wherein the second stage circuit produces a voltage reduction at its output from the voltage appearing at its input; and a bias voltage generator circuit producing a plurality of biasing voltages, one biasing voltage per stage, wherein the biasing voltage for each stage is coupled to the biasing sub-circuit to increase the voltage reduction from the input terminal to the output terminal of that stage.

20. The device according to claim 19, wherein the biasing sub-circuit is formed in a P-type substrate and comprises a diode having an anode and a cathode, the anode coupled to the body of the NMOS transistor and the bias voltage generator circuit, and the cathode coupled to a second voltage, wherein the P-N junction between the N-type well within which the NMOS transistor is formed and the P-type substrate is reverse biased.

21. The device according to claim 19, wherein the biasing voltages are increasingly negative from the first stage to the second stage.

22. The device according to claim 19, further comprising a plurality of speed up circuits coupled respectively to each of the plurality of stage circuits wherein the speed up circuit causes the output of each stage circuit to reach steady state in a decreased time period than without the speed up circuit present.

23. The device according to claim 22, wherein each respective speed up circuit comprises a diode.

24. The device according to claim 14, wherein the stage circuit further comprises a capacitor coupled to the output terminal.

25. The device according to claim 19, wherein each stage includes a capacitor and the capacitor comprises:

a first capacitor terminal; and an n-type well having a bulk biasing terminal coupled to the first capacitor terminal.

26. A charge pump circuit comprising;

a plurality of charge pump stages including a first stage and a second stage;

a decoupling stage between the second stage of the charge pump and a final output terminal of the charge pump circuit; and a bias voltage generator generating a plurality of bias voltages from the voltage of the final output terminal of the charge pump.

27. The circuit according to clam 26 wherein each stage has an input terminal and an output terminal and the output terminal of the first stage is coupled to the input terminal of the second stage.

28. The circuit according to claim 27 further including a third charge pump circuit having an input terminal coupled to the output terminal of the second charge pump stage.

29. The circuit according to claim 27 in which each stage further includes:

at least one MOS transistor formed with an N-well, coupled between a first voltage and an output terminal for that particular stage;

a biasing sub-circuit coupled to the N-MOS transistor in each stage; and a bias voltage generator circuit producing a plurality of biasing voltages, one biasing voltage per stage wherein the biasing voltage for each stage is respectively coupled to the biasing sub-circuit for each stage.

30. The circuit according to claim 27 further including a plurality of speed up circuits within each respective stage.

31. The device according to claim 30 wherein the speed up circuit comprises a diode.

* * * * *

UNITED STATES PATENT AND TRADEMARK OFFICE
CERTIFICATE OF CORRECTION

PATENT NO. : 6,130,572  
DATED : October 10, 2000  
INVENTOR(S) : Andrea Ghilardelli et al.

Page 1 of 1

It is certified that error appears in the above-identified patent and that said Letters Patent is hereby corrected as shown below:

<u>Title page,</u>
Item [30], the Foreign Priority Application number should read -- 97830014.3 --.

Signed and Sealed this

Twelfth Day of February, 2002

Attest:

Attesting Officer

JAMES E. ROGAN  
Director of the United States Patent and Trademark Office